United States Patent [19]

Choquier et al.

[11] Patent Number: 5,768,515

[45] Date of Patent: Jun. 16, 1998

[54] METHOD FOR GENERATING AND STORING TWO SEGMENTS OF HTTP MESSAGE HEADERS WITH DIFFERENT LIFETIMES AND COMBINING THEM TO FORM A SINGLE RESPONSE HEADER

[75] Inventors: Philippe Choquier; Murali R. Krishnan, both of Bellevue, Wash.

[73] Assignee: Microsoft Corporation, Redmond, Wash.

[21] Appl. No.: 677,636

[22] Filed: Jul. 8, 1996

[51] Int. Cl.⁶ .................................................. G06F 7/00
[52] U.S. Cl. ........................... 395/200.36; 395/200.33; 395/603; 370/389
[58] Field of Search ................. 395/200.36, 200.33, 395/603; 370/389

[56] References Cited

U.S. PATENT DOCUMENTS

| | | | |
|---|---|---|---|
| 5,327,557 | 7/1994 | Emmond | 395/603 |
| 5,398,245 | 3/1995 | Harriman, Jr. | 370/389 |

FOREIGN PATENT DOCUMENTS

| | | | |
|---|---|---|---|
| 2078395 | 9/1992 | Canada | 9/46 |
| 0 652 666 A1 | 11/1994 | European Pat. Off. | 1/32 |

OTHER PUBLICATIONS

Rubenking (Languages) PC Magazine, pp. 1–2, Nov. 1993.

*Primary Examiner*—Parshotam S. Lall
*Assistant Examiner*—Gautam R. Patel
*Attorney, Agent, or Firm*—Duft, Graziano & Forest, PC

[57] ABSTRACT

A system for generating message headers where previously saved message headers are retrieved from memory when needed to satisfy a message header requirement. Message headers are comprised of segments where each message header segment has a different lifetime. In particular, a file-object response message header includes a header segment containing information linked to the requested file-object. This file-object linked header segment is retrieved when needed from a file-object header cache. A file-object response message header includes other segments such as one containing time-variant global information and time-invariant global information. Building header messages from multiple segments retrieved from their respective cache memories saves significant processing time as compared to generating a new message header each time a header is required by operation of a network server application.

14 Claims, 4 Drawing Sheets

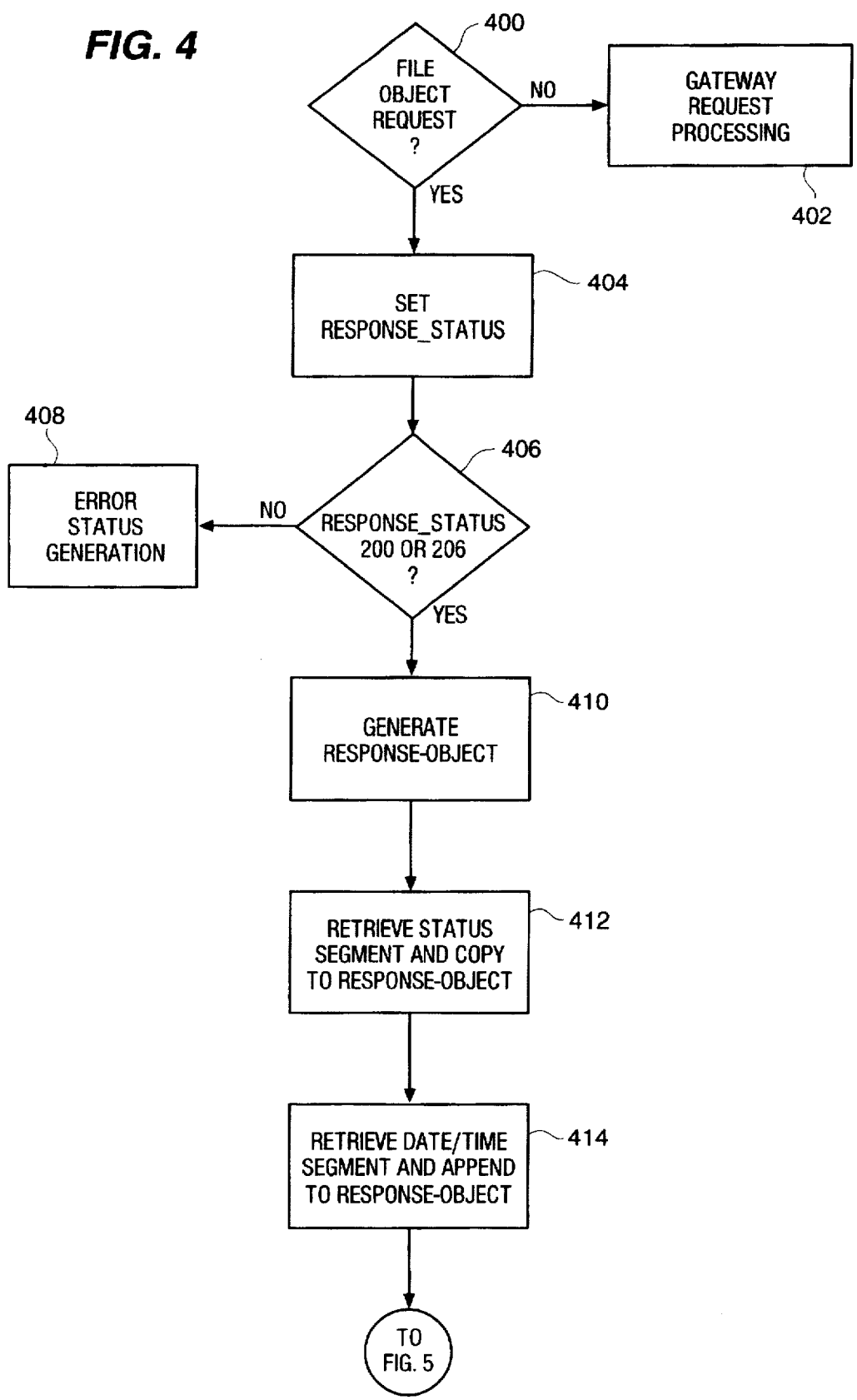

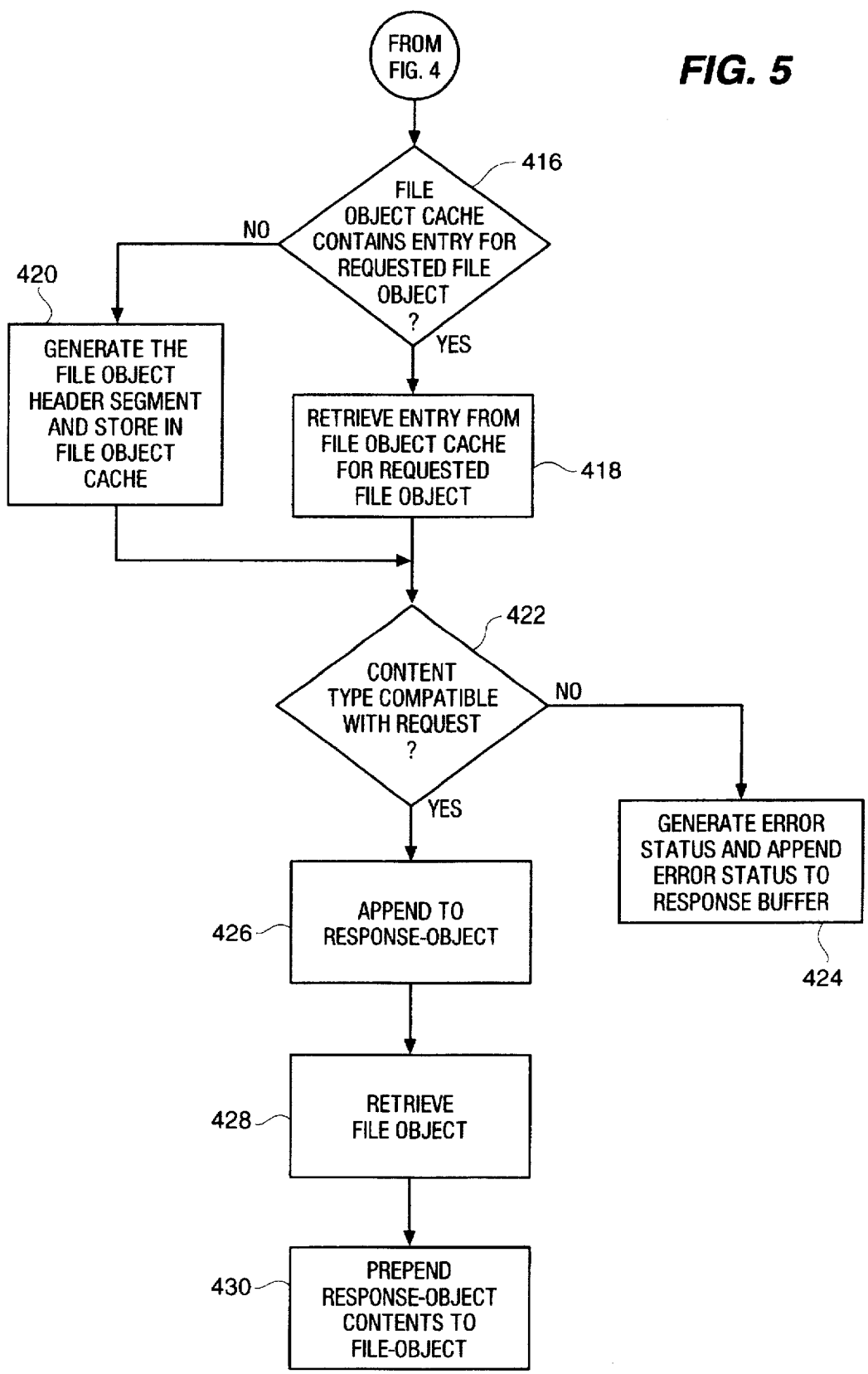

METHOD FOR GENERATING AND STORING TWO SEGMENTS OF HTTP MESSAGE HEADERS WITH DIFFERENT LIFETIMES AND COMBINING THEM TO FORM A SINGLE RESPONSE HEADER

FIELD OF THE INVENTION

The invention relates to the generation of message headers in a network-computing environment. In particular, the invention relates to a caching mechanism or more efficiently generating message headers where all or part of a message header has been previously generated.

STATEMENT OF THE PROBLEM

In a computer network there are often repeated requests for the same resource placed by clients on a server. The server responds to each request according to the communications protocol employed by the particular network. When responding to a request that is similar to an earlier processed request, a server repeats the same protocol-defined steps as were performed in response to the earlier request. The internet, a specific computer network, is a world-wide interconnection of computers, or servers, in business, academic and commercial use. The internet provides its users with access to vast amounts of information and resources. The World-Wide Web (hereinafter "the Web") is the portion of the internet that allows the presentation and exchange of information in a graphical format providing representations of graphical and photographic data in addition to textual information. A significant reason for the dramatic growth in the use of the Web is the standardization and use of a common communications protocol for the presentation and exchange of information on the Web. The use of a common communications protocol allows almost anyone with a computer to connect to, and interact with the Web, regardless of the type of computer hardware and software an individual computer might employ.

The standard protocol of the Web is known as hypertext transfer protocol (hereinafter "HTTP"). There are currently several versions of HTTP with more recent versions being backwards-compatible to earlier versions. All versions of HTTP share the same basic organization.

The basic unit of HTTP communications is the "message". A message consists of a structured sequence of octets matching the syntax defined by the HTTP protocol. Each message is comprised of a header and a message body. Messages are exchanged between clients and servers. A server or "Web server" is an application program that accepts connections from clients and other servers in order to receive request messages from clients and, in response, deliver response messages to the requesting client.

There are essentially two types of requests that a Web server must service, file-object requests and gateway requests. A file-object request is a request from a client that the server deliver a file-object, which resides at a location locally accessible to the server, to the client. A gateway request is a request from a client for a resource that does not reside in the file system. In the case of a gateway request, the Web server acts as an intermediary between the client and another application.

A majority of the requests serviced today by a Web server are file-object requests. Every time a file-object request is communicated from a client to a server, the server must retrieve the file-object itself and prepend to the file-object a response message header. The response header contains information about the version of HTTP utilized, the status of the response, the current date and time, and information linked to the version of the requested file-object such as its length and the last time it was modified.

Existing Web servers generate a new response header for every response message generated by the Web server. The information contained in the response header according to the HTTP protocol is in ASCII format and can therefore be relatively lengthy in terms of the number of bytes required to form the header. As a result, generation of response headers consumes a significant portion of the Central Processing Unit's available processing time ("CPU time") in existing Web servers.

There exists a need for a method of generating HTTP headers which is more efficient in use of CPU time than the current method of generating a new header each time an HTTP request is serviced by the Web Server.

STATEMENT OF THE SOLUTION

The above described problems and others are solved and an advance in the art is achieved by the header cache memory system of the present invention. The methods of the present invention provide a header cache memory system for storing the last most recently used headers. If a request arrives at the server which requires the same header as one recently generated, the cache management routine locates the previously generated header in the cache, updates the cached header for any changes in time variant information, and outputs the header for use by the Web server. This capability is a significant savings of processing capability when repetitive requests arrive, such as internet requests for a file.

It is the nature of the application of many servers to receive repeated requests for the same resource or file-object. The result is that existing servers generate portions of the same response header repeatedly for each request for the same file-object. The cache memory methods of the present invention improve the server efficiency by caching the last most recently used headers and then retrieving the cached headers when similar file-object requests are received. Retrieving already-generated headers from cache memory is much quicker, and thus more efficient, than re-generating the header information for each request. As a result the server application consumes less CPU time making more CPU time available for serving additional requests or for other tasks.

An application of the present invention is in the field of Web servers where a high volume of HTTP messages are processed. Each message requires a header and some or all of the information contained in the headers is repeated when a current response or request is similar to a previous response or request.

The generations of file-object request message headers is highly repetitive in a Web server and therefore provides a good example of the methods of the present invention. Each response header of the present invention is compiled from various header segments having different "lifetimes". A first segment of the response header of the present invention includes information related to the status of the response. A response to a HTTP file-object request is either a complete response or a partial response. That status, complete or partial, as well as the version of the Web server application, represents time-invariant information and is stored in a first cache memory by the methods of the present invention. A second cache memory is used to store date and time information which, of course, varies with time. A third cache memory is used to store information linked to the particular file-object that is specified in a given HTTP request. This information, once generated for the first time, does not change until the file-object is modified and, when stored in the third cache memory (the "file-object cache"), is available for use each time the Web server services a file-object request for that file-object.

The methods of the present invention operate to receive a file-object request and generate a response-object associated with the request. The various header segments are then retrieved from their respective cache memories and appended to the response-object, thereby building a complete response header. The appropriate header segment for the current response status and the header segment for the date/time information are both copied from the first and second cache memories, respectively, to the response-object. The file-object cache is checked to determine if a header segment associated with the file-object identified by the request already exists. If a header segment for the requested file-object exists in the file-object cache, then the appropriate header segment is appended to the response-object thereby completing generation of the HTTP response header. If there is not already a header segment for the requested file-object in the file-object cache then the Web server generates the appropriate header segment for the file-object. The generated header segment is then appended to the response-object and is copied to the file-object cache. The appropriate header segment is then available for retrieval from the file-object cache when the particular file-object is again referenced by a later request message.

The completed HTTP response header is then prepended to the retrieved file-object. In this fashion the HTTP response, comprised of a header and the requested file-object, is ready for transmission to the client.

BRIEF DESCRIPTION OF THE DRAWINGS

FIGS. 4-5 illustrate header generation according to the present invention in flow diagram form.

DETAILED DESCRIPTION

General Network Computing Environment

FIG. 1

Figure 1:
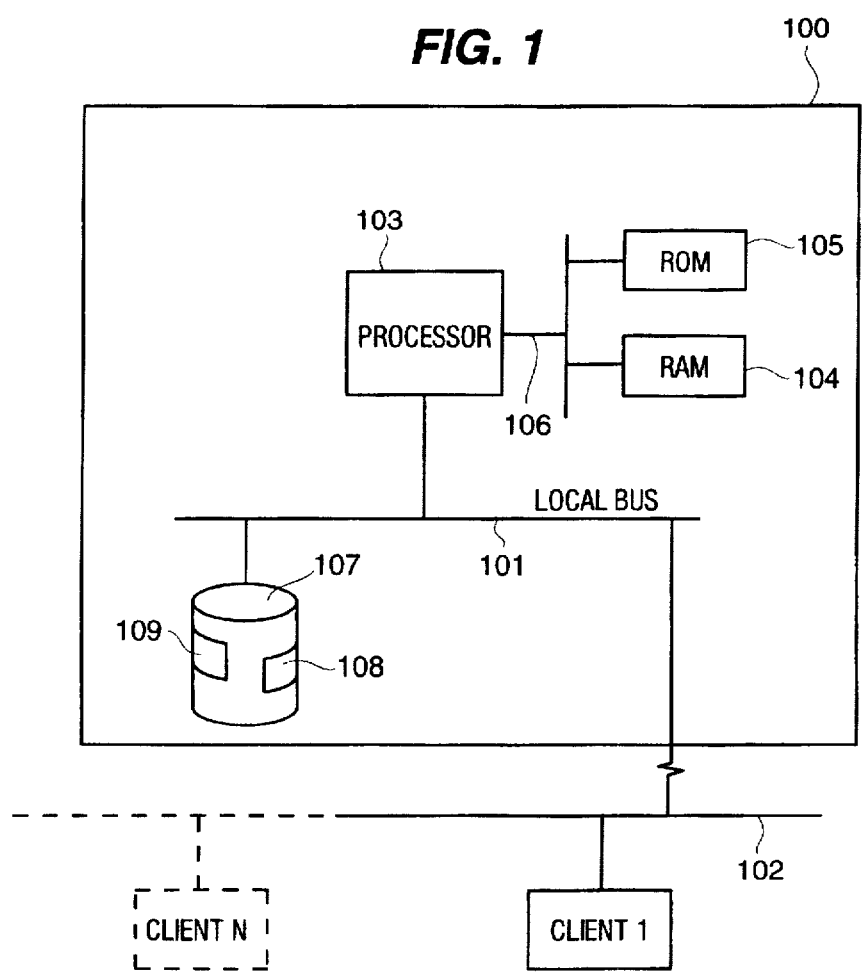
FIG. 1 illustrates a network-computing environment in block diagram form.

FIG. 1 illustrates a block diagram of server 100 connected over local bus 101 to network 102. Also connected to network 102 are clients 1-N all operable for the exchange of information therebetween. Client 1 represents a first client while client N represents any number of additional clients connected to the network. Server 100 communicates with clients 1-N using a standard communications protocol. In the example of the following FIGS. 2-5, the standard communications protocol described is HTTP although one skilled in the art will recognize that the methods of the present invention are also applicable to other communications protocols. A server 100 communicating under the HTTP is also known as a Web server 100. Programmed instructions for the HTTP header generation system of the present invention are executable on processor 103. Processor 103 stores and/or retrieves the programmed instructions and/or data from memory devices that include, but are not limited to, Random Access Memory (RAM) 104 and Read Only Memory (ROM) 105 by way of memory bus 106. Another accessible memory device includes storage device 107 by way of local bus 101. Storage device 107 is any kind of computer storage device and can be viewed as the file system of server 100. Programmed instructions for implementing the HTTP header generation system of the present invention are stored on storage device 107 as part of server application 108. Also stored on storage device 107 is file-object 109. The HTTP header generation system of the present invention is operable in any of several standard computing operating systems readily available in the industry.

HTTP Message Format and Header Content

FIG. 2

Figure 2:
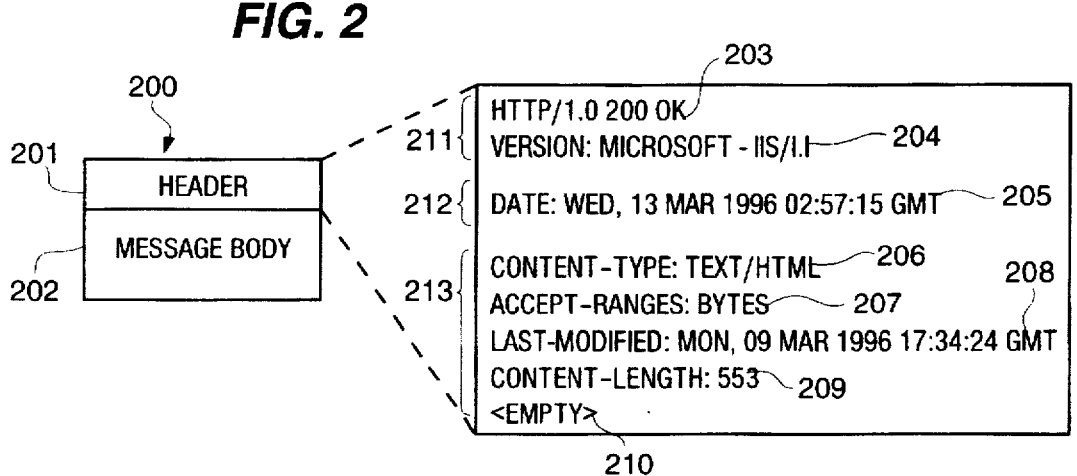
FIG. 2 illustrates an HTTP message format in block diagram form and a sample HTTP response header.

The basic unit of communications in HTTP is the message. A client transmits a request message, having a predetermined format, to a server. A server, in response to a request message, transmits a response message back to the client. FIG. 2 depicts the general format of an HTTP message 200. Message 200 is comprised of header 201 and message body 202. Header 201 contains certain administrative information as described in more detail below. Message body 202 contains the substantive content of the message. For example, in the case of a response message 200 in response to a file-object request, message body 202 contains the requested file-object. Each HTTP request message from a client 1-N, for example, and each HTTP response message generated by server 100 has the same basic format as HTTP message 200 of FIG. 2. Although request messages and response messages share the general format depicted in FIG. 2, and the methods of the present invention are equally applicable to both, the remaining discussion relates specifically to response messages and, in particular, to the generation of header 201 of response message 200.

Server 100 processes different types of request messages. One type of request message processed by server 100 is a gateway request. Server 100 acts as an intermediary between applications when processing a gateway request. Another type of request message processed by server 100 is a file-object request. A file-object request is a request from a client to a server requesting a copy of a resource or file-object residing in a file system accessible to the server. In response to a request for file-object 109, server 100 retrieves the requested file-object 109, generates header 201, and prepends header 201 to a copy of file-object 109. This forms response message 200. Server 100 then transmits response message 200 to the requesting one of clients 1-N over network 102. The methods of the present invention provide a more efficient means for generation of header 201 and are described with respect to response messages generated by server 100.

File-object requests can comprise a significant portion of the requests handled by a server 100. Each request message handled by server 100 requires the generation of a header 201 for the corresponding response message 200. When using a communications protocol such as HTTP, where the data is formatted according to the ASCII format, each of lines 203-210 is comprised of many bytes of data. Lines 203-210 of FIG. 2 are representative of the content of header 201 as defined by the HTTP. Generating a header containing on the order of 200 bytes of data consumes CPU time which is, of course, multiplied for multiple requests. The present invention provides methods whereby, to the extent possible, previously-generated and cached header segments are re-used in the generation of the current response header. In this fashion, server 100 does not have to duplicate steps already taken and thereby saves CPU time for other tasks.

Lines 203-210 represent information specific to HTTP protocol. The specific content however, is less important than the fact that different segments of lines 203-210 have different properties affecting the extent to which a previously generated header 201 can be re-used in responding to later requests. Lines 203-204 contain information about the version of server application 108, the version of HTTP protocol implemented by server application 108, and the status of the response. The information contained in lines 203-204 is global, meaning it is not linked to a particular file-object, and is not variable over time. Line 205 contains date and time information and is also global but is variable over time. Lines 206-209 of header 201 contain information linked to the particular file-object to which response message 200 pertains. Line 210 is an empty line which operates as the header delimiter. The information contained within each of lines 203-210 is defined by the HTTP protocol. Those skilled in the art will understand that headers generated utilizing communications protocols different than HTTP will define a different format than herein described but that the header generation method of the present invention is equally applicable to other communications protocols.

As noted above, header 201 contains different segments of information. Namely, lines 203-204, "status segment 211", contain time-invariant, global information. Line 205, "date/time segment 212", contains time-variant, global information. Lines 206-210, "file-object segment 213", contain information linked to a particular file-object 109. Each of these header segments 211-213 has a different lifetime in that the extent to which segments from a previously generated header 201 can be used again for a later generated header 201 depends on the lifetime of the segment. For example, the file-object segment, lines 206-209, of a previously generated header 201 can be re-used for a response to a later request for the same file-object, assuming the file-object has not been modified since the previous request. However, the date/time segment of the same previously generated header 201 cannot be re-used as its content will have changed since the previous request. The present invention takes advantage of the variation in lifetimes of the various header segments to optimize the efficiency of the header generation process. Those skilled in the art will recognize that other communications protocols might employ additional or different categories of information. An example is encoding information that might be utilized in another protocol but is not part of the present example. Other types and categories of information are viewed by the inventors as falling within the scope of the present invention.

Methods of the Present Invention: In General

FIG. 3

Figure 3:
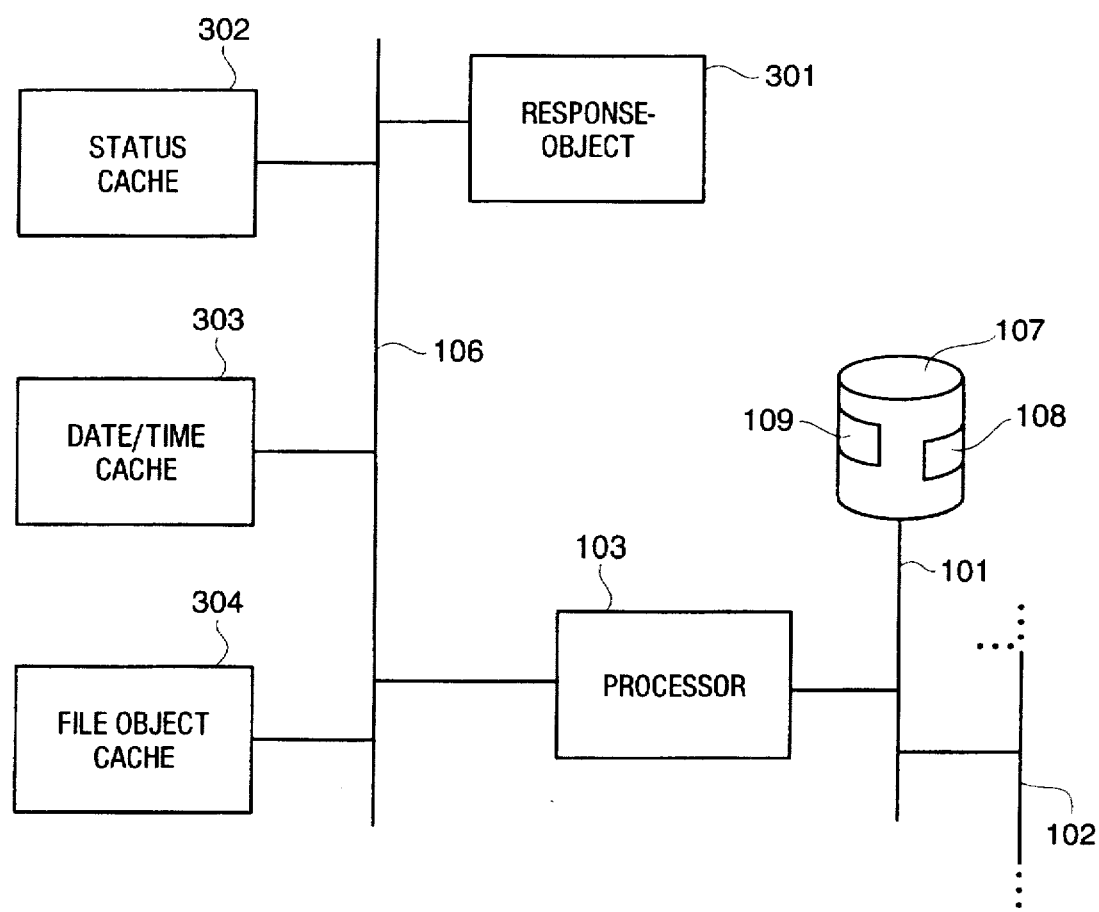
FIG. 3 depicts the cache memory system of the present invention in block diagram form.

FIGS. 1-3 are used to describe in general the methods of the present invention for generating headers 201. A request message is received by processor 103 over network 102 and local bus 101 from one of clients 1-N. The request message is a file-object request requesting that a copy of file-object 109 be delivered from server 100 to the requesting client. In response to receiving the request message, server application 108, the steps of which are executed by processor 103, creates a response-object 301 for each file-object 109 referenced by the file-object request. In the current example, the request message references just one file-object 109 and therefore generates a single response-object 301. Response-object 301 is available for the storage of header segments in order to build the response header 200. The various header segments are retrieved from as many cache-memories as there are header segments having different lifetimes, as described above. Caches 302-304 and response object 301 are maintained on RAM 104 of server 100 or any suitable storage device in a file system accessible to server 100.

The process of building the response header of the current example begins with status segment 211. Server application 108 determines the status of the response. If the request message was successfully received, understood, and accepted by server 100, than one of several successful status values is assigned to the response indicating that a response message 200 is to be generated. If the request message was not successfully processed then an error message is generated as a response to the requesting client. A predetermined status header segment is stored in status cache 302 for each possible variation of a successful status header segment. For example, in an embodiment of the present invention, there are two possible variants of the status header segment 211, a first indicating a full response to the request and a second indicating a partial response to the request. A partial response is one in which a client has requested a subset of a file-object. Only the status information in line 203, i.e., "200 OK", of the status segment is different between the two variants since the HTTP version and server application 108 version information does not change. Server application 108 operates to retrieve the appropriate status header segment from status cache 302 in response to determining the status of the current response. In the current example, the status of the current response is "200 OK" indicating a full response to the request, therefore the appropriate status segment 211 is retrieved from status cache 302 and copied to response-object 301.

Server application 108 next operates to retrieve the current date/time information from date/time cache 303 and appends the information as date/time segment 212 to response-object 301. At this point in the process of generating header 201, response-object 301 contains segments 211 and 212. The contents of date/time cache 303, which represent header segment 212, can be updated in any number of ways. In one embodiment of the present invention, a specialized sub-system or Applications Programming Interface (API) continuously updates the contents of date/time cache so that the current date/time information is available to server application 108 when it is necessary for server application 108 to copy header segment 212 to response-object 301. It is apparent to those skilled in the art that the method of updating the contents of date/time cache 303 is not pertinent to the present invention and could be accomplished in a variety of ways. Another example of a method for updating the contents of date/time cache 303 is to update the cache contents when the date/time text representation is requested, rather than updating continuously.

Server application 108 next checks the contents of file-object cache 304 to determine if file-object cache 304 contains cached properties, segment 213, for file-object 109. If file-object cache 304 contains segment 213 for file-object 109 then segment 213 is appended to the contents of response-object 301. Response-object 301 now contains header segments 211, 212, and 213 which comprise the complete header 201. Server application 108 then prepends the contents of response-object 301 to file-object 109 to complete the generation of response message 200. Once completed, response message 200 is transmitted to the requesting client over network 102.

If, in the above example, file-object cache 304 did not contain cached properties segment 213 for file-object 109, server 100 would generate the appropriate header segment according to known methods and prepend the generated segment 213 to response-object 301. In addition, server 100 would operate to store segment 213, once generated, in file-object cache 304 to make the appropriate segment 213 available for later requests specifying file-object 109.

File-object cache 304 contains multiple file-object segments 213, one for each file-object 109 for which a response message has been generated. In order to ensure that the segments 213 contained in file-object cache 304 represent valid information, file-object cache 304 must be periodically updated. There is more than one means for accomplishing this update of file-object cache 304. A relatively straight-forward approach is to flush or delete the contents of file-object cache 304 at regular intervals. For example, in an embodiment of the present invention, file-object cache 304 is flushed every 30 seconds after which the contents of file-object cache 304 are rebuilt with each response to a file-object request message. Another approach is to selectively update the contents of file-object cache 304 each time a relevant piece of data changes for a given file-object. Then only the changed file-object header segment 213 in file-object cache 304 is over-written with the new information. It is apparent to those skilled in the art that the method of updating the contents of file-object cache 304 is not pertinent to the operation of the present invention. A full request is a request for a complete file-object while a partial request is a request for a subset of a file-object.

Methods of the Present Invention: Flowcharts

FIGS. 4–5

A flowchart depicting the method of the present invention begins on FIG. 4 and continues to FIG. 5. Processing begins with decision block 400 which operates to receive a request message and determine if the last received request message is a file-object request or a gateway request. If the last received request message is a gateway request then processing continues to step 402 where the request message is processed as appropriate for the request type. The operation of step 402, and steps subsequent to step 402 (not shown) are not pertinent to the present invention. If the last-reeived request message is a file-object request, then processing continues to step 404.

Step 404 operates to set a variable named Response_Status to the appropriate value. The proper value of Response_Status is determined by the operation of server application 108. The details of determining the response status for a given request are not germane to the present invention and are known to those skilled in the art. In general, server application 108 determines if the file-object request is a full request or a partial request. If so, it is determined if the requested action can be completely performed. If the file-object request is a full request then a value of "200 OK" is assigned to Response_Status. If the request message is successfully received but the requested action applies to a subset of a file-object then a different value, "206 Partial Content", is assigned to Response_Status. Various other values may be assigned to Response_Status as well for other types of requests. However, as described below, the current example describes header generation in response to successfully received full and partial file-object requests.

Decision block 406 operates to determine if the variable Response_Status indicates a successfully received request message, i.e., Response_Status equal to "200 OK" or "206 OK". If Response_Status is not equal to "200 OK" or "206 OK" then processing continues to step 408 where an error status is generated. The operation of this step 408, and steps subsequent to step 408 (not shown), are not pertinent to the present invention. If the value of Response_Status does indicate a successfully received request message, then processing continues to step 410.

Step 410 operates to generate a response-object 301 for each file-object specified by the last-received request message. Response-object 301 is created in RAM 104 or another suitable memory device. Processing then continues to step 412.

Step 412 operates, for each file-object 109 specified in the last received request message, to retrieve the appropriate status segment 211 from status cache 302 and copy the retrieved status segment 211 to the corresponding response-object 301. Processing then continues to step 414 where segment 212 is retrieved from datetime cache 303 and appended to the contents of each response-object 301. Processing then continues to decision block 416 on FIG. 5.

Decision block 416 operates to determine if file-object cache 304 contains an entry for file-object 109 specified in the last-received request message. This check for cached file-object properties is accomplished by any one of several means. The contents of file-object cache 304 can be reviewed for the relevant entry or, alternatively, if a file-object cache index has been generated by server application 108 then the index contents are checked. If the relevant file-object properties are already stored in file-object cache 304 then processing continues to step 418. Otherwise, processing continues to step 420 where file-object header segment 213 is generated according to known methods and the generated header segment is stored in file-object cache 304.

Step 418 operates to retrieve the stored file-object header segment 213 from file-object cache 304. Processing then continues to decision block 422 to determine if the content-type of file-object 109 is compatible with the content-type specified in the request message. The request message, as described above, contains a header. The request message header includes a field indicating the file-object content-type list acceptable by the client. If the acceptable content-type list does not match the content-type of file-object 109, as indicated by file-object segment 213, processing continues to step 424. Step 424 operates to generate the appropriate error status indicating an incompatibility of content-types between the request and file-object 109 and then appends the generated content-type error status to response buffer 301. If, in decision block 422, the content type of file-object 109 is compatible with the content type specified in the request, then processing continues to step 426.

Step 426 operates to append file-object segment 213 to the contents of response-object 301. This step 426 is executed regardless of whether file-object segment 213 was retrieved from file-object cache 304 or generated anew in response to the current request. Response-object 301 now contains a complete response header comprised of segments 211–213. Processing then continues to step 428 to complete response message 200.

Step 428 operates to retrieve a copy of the requested file-object 109 from storage device 107. The completed response header 200 is prepended from response-object 301 to file-object 109 thereby completing the formation of response message 200.

In the event that a single request message references multiple file-objects 109, then steps 416-430 are repeated for each referenced file-object 109. A separate response-object 301 is generated and populated for each referenced file-object 109.

Summary

The header generation system of the present invention includes a method and apparatus for efficiently generating headers for network messages by retrieving saved headers, as appropriate, rather than building each header anew for every instance in which a header is necessary. Although specific embodiments are disclosed herein, it is expected that persons skilled in the art can and will design alternative header generation systems that are within the scope of the following claims either literally or under the Doctrine of Equivalents.

We claim:

1. A method in a Web server application for producing a required HTTP response message header, comprising the steps of:

storing a first segment of n of the last HTTP response message headers generated in a first cache memory, said first segment of each said HTTP response message header containing header information having a first lifetime; and storing a second segment of said n of the last HTTP response message headers generated in a second cache memory, said second segment of each said HTTP response message header containing header information having a second lifetime;

generating said required HTTP response message header by:

selecting one of said first segments from said first cache memory:

selecting one of said second segments from said second cache memory; and combining said selected first segment and said selected second segment to form said required HTTP response message header.

2. A method according to claim 1 wherein said generating step includes:

detecting a header generation signal from said Web server application wherein said header generation signal indicates the need to generate said required HTTP response message header, creating a header object in response to said header generation signal, obtaining said selected first segment from said first cache memory and appending said selected first segment to said header object, obtaining said selected second segment from said second cache memory and appending said selected second segment to said header object to produce said required HTTP response message header; and providing said required HTTP response message header from said header object to said Web server application.

3. A method according to claim 2 wherein said step of obtaining said first selected segment from said first cache memory includes:

obtaining said first selected segment from said first cache memory wherein said first selected segment contains header information linked to a requested resource in a file system.

4. A method according to claim 2 wherein said step of obtaining said second selected segment from said cache memory includes:

obtaining said second selected segment from said second cache memory wherein said second selected segment contains global header information.

5. A computer-readable medium having computer-executable instructions for performing the steps recited in claim 2.

6. A method according to claim 1 wherein said step of storing a first segment includes:

storing said first segment in said first cache memory wherein said first segment contains header information linked to a last requested file object.

7. A method according to claim 6 wherein said generating step includes:

selecting said first segment from said first cache memory, wherein said retrieved first segment contains said header information linked to said requested file object, selecting a remainder segment of said HTTP response message header from said second cache memory, wherein said remainder segment of said HTTP response message header contains global information; and combining said first segment and said remainder segment to form said HTTP response message header.

8. A method according to claim 7 wherein said step of selecting said remainder segment includes:

obtaining said second segment of said HTTP response message header from said second cache memory wherein said second segment contains time-variant global information; and obtaining a third segment of said HTTP response message header from a third cache memory wherein said third segment contains time-invariant global information.

9. A method according to claim 1 wherein said step of generating one of said HTTP response message headers includes:

generating said header generation signal in response to receipt of a file object request wherein said header generation signal indicates the need to generate said HTTP response message header, creating said header object in response to said header generation signal, obtaining said first segment from said first cache memory and appending said first segment to said header object, wherein said retrieved first segment contains a header information linked to said requested file object, obtaining said second segment from said second cache memory and appending said second segment to said header object, wherein said second segment contains time-variant global information, obtaining a third segment from a third cache memory and appending to said header object to complete said message header wherein said third segment contains time-invariant global information; and providing said HTTP response message header from said header object to said Web server application.

10. A method according to claim 9 wherein said step of obtaining said second segment includes:

obtaining said second segment of said message header from said second cache memory wherein said second segment contains date and time information.

11. A method according to claim 9 wherein said step of selecting one of said first segments includes:

determining, in response to said file-object request, desired characteristics of said first segment, searching said first cache memory for a one of said first segments having said desired characteristics, and retrieving said one of said first segments having said desired characteristics.

12. A method according to claim 11 wherein said step of selecting one of said first segments includes:

creating, in response to receipt of said file object request, a response object, appending said one of said first segments having said desired characteristics to said response object, retrieving said second segment from said second cache memory; and appending said second segment to said response object whereby said HTTP response message header is completed.

13. A computer-readable medium having computer-executable instructions for performing the steps recited in claim 9.

14. A computer-readable medium having computer-executable instructions for performing the steps recited in claim 1.

* * * * *